(12) United States Patent  (10) Patent No.: US 8,922,432 B2
Young  (45) Date of Patent: Dec. 30, 2014

(54) METHOD AND APPARATUS FOR LIMITING REDUNDANT POSITIONING POLLING FROM A MOBILE DEVICE IN A REAL-TIME LOCATION SYSTEM (RTLS)

(75) Inventor: Stacy Young, Kanata (CA)

(73) Assignee: Adobe Systems Incorporated, San Jose, CA (US)

( * ) Notice: Subject to any disclaimer, the term of this patent is extended or adjusted under 35 U.S.C. 154(b) by 493 days.

(21) Appl. No.: 13/331,493

(22) Filed: Dec. 20, 2011

(65) Prior Publication Data

US 2013/0154882 A1    Jun. 20, 2013

(51) Int. Cl.
*G01S 3/02*    (2006.01)
(52) U.S. Cl.
USPC .......................... 342/451; 342/457; 342/463
(58) Field of Classification Search
CPC ............ G01S 5/06; G01S 5/14; G01S 5/0252
USPC ................... 342/357.25, 451, 457, 463–465; 455/456.1, 456.6
See application file for complete search history.

(56) References Cited

U.S. PATENT DOCUMENTS

2010/0090901 A1*    4/2010   Smith et al. ................... 342/451

* cited by examiner

*Primary Examiner* — Dao Phan
(74) *Attorney, Agent, or Firm* — Moser Taboada

(57) ABSTRACT

A method and apparatus for limiting redundant positioning polling from a mobile device in a Real-Time Location System (RTLS) is disclosed. The method comprises reading a current position of the mobile device, establishing a virtual perimeter around the mobile device, measuring a plurality of signal strengths from a plurality of access points within the virtual perimeter, determining whether the mobile device has moved outside of the virtual perimeter, and transmitting a plurality of signal strengths from a plurality of access points to a location server when the mobile device has moved outside of the virtual perimeter.

17 Claims, 5 Drawing Sheets

METHOD AND APPARATUS FOR LIMITING REDUNDANT POSITIONING POLLING FROM A MOBILE DEVICE IN A REAL-TIME LOCATION SYSTEM (RTLS)

BACKGROUND OF THE INVENTION

1. Field of the Invention

Embodiments of the present invention generally relate to real-time location systems (RTLS) and, more particularly, to a method and apparatus for limiting redundant positioning polling from a mobile device in a Real-Time Location System (RTLS).

2. Description of the Related Art

To take advantage of the ubiquitous nature of mobile devices, businesses have developed many uses for tracking a mobile device (or tracking a person carrying the mobile device) within a building, such as a shopping mall or an office building. For example, in a shopping mall, businesses may entice a person carrying a mobile device to shop by sending coupons or sales notices to a mobile device when that mobile device is proximate a particular store or service center. An office manager may need instant information regarding where an employee is located within a large office complex.

Wi-Fi access points (or hotspots) provide a means for determining the location of mobile devices. RTLS provides real time locating of mobile devices by measuring the signal strength of Wi-Fi access points proximate the mobile device. Currently, in RTLS, a mobile device is tracked by continuously monitoring the signal strength from various Wi-Fi access points and reporting the signal strengths to a central server. The central server determines the location of the mobile device and transmits the location back to the mobile device. This is referred to as position polling, or actively sampling the location of the mobile device. However, such continuous reporting between the mobile device and the central server results in an unnecessary reduction in performance because very few location updates received from the mobile device actually correlate to a real positional change of the mobile device. For example, positional polling of the mobile device continues even if a person carrying the mobile device is stationary, for example, in his office and places the mobile device on his desk. As such, positional polling imposes a performance penalty on the system. It consumes excessive power from the mobile device due to establishing network connections with a central server, leading to an undesirable loss of performance and battery life.

Therefore, there is a need for a method and apparatus for limiting redundant positioning polling from a mobile device in a Real-Time Location System (RTLS).

SUMMARY OF THE INVENTION

Embodiments of the present invention generally relate to a method and apparatus for limiting redundant positioning polling from a mobile device in a Real-Time Location System (RTLS). In an embodiment, the method comprises reading a current position of the mobile device, establishing a virtual perimeter around the current position, measuring a plurality of signal strengths from a plurality of access points within the virtual perimeter, determining whether the mobile device has moved outside of the virtual perimeter, and transmitting a plurality of signal strengths from a plurality of access points to a location server when the mobile device has moved outside of the virtual perimeter.

Figure 1:
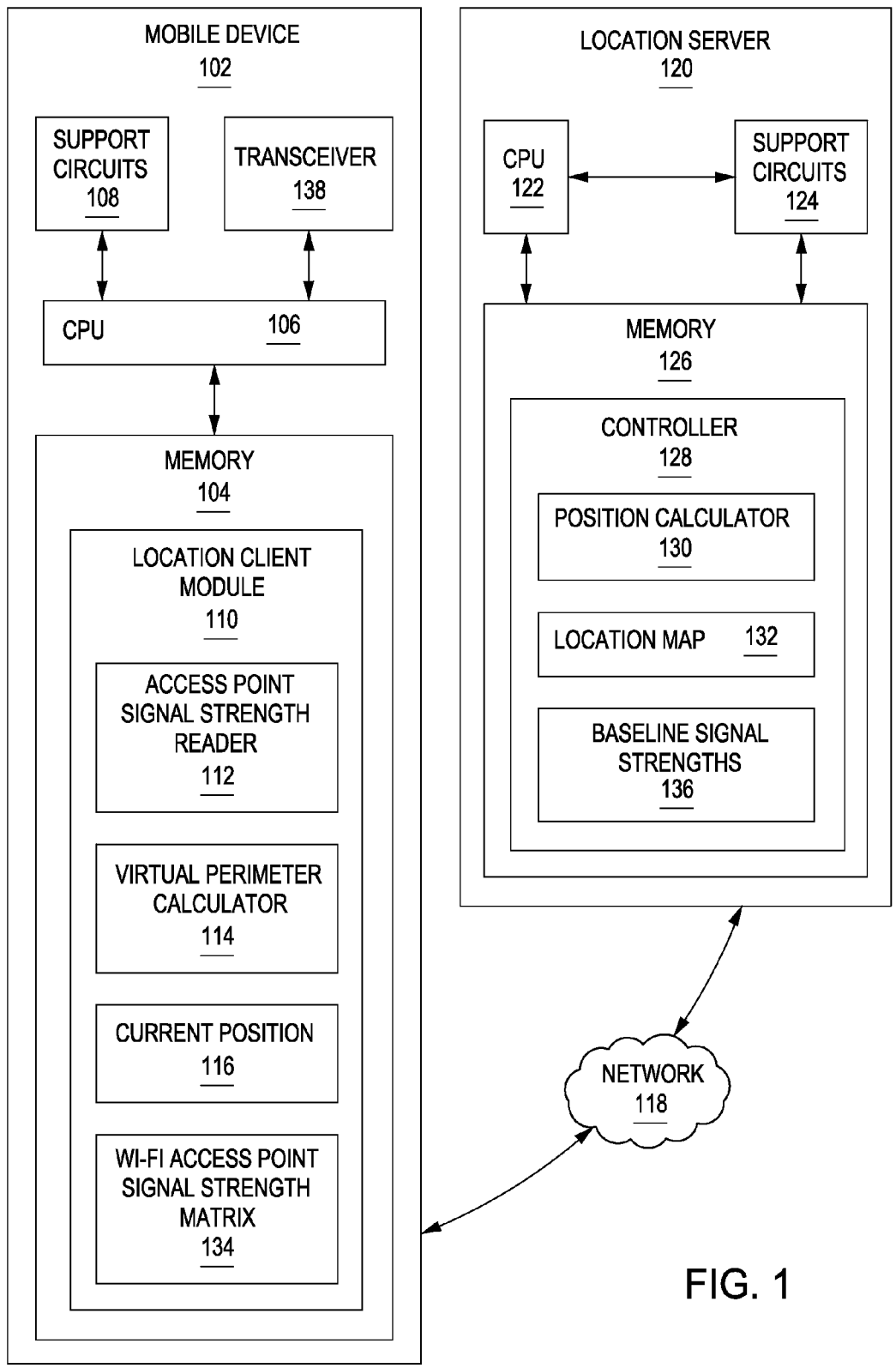
FIG. 1 depicts a block diagram of a system for limiting redundant positioning polling from a mobile device in a Real-Time Location System (RTLS), according to one or more embodiments.

While the method and apparatus is described herein by way of example for several embodiments and illustrative drawings, those skilled in the art will recognize that the method and apparatus for limiting redundant positioning polling from a mobile device in a Real-Time Location System (RTLS) is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for limiting redundant positioning polling from a mobile device in a Real-Time Location System (RTLS) as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for limiting redundant positioning polling from a mobile device in a Real-Time Location System (RTLS). In one embodiment, a location server calculates the position of a mobile device based on the strength of multiple access point signals measured by the mobile device, and transmits that location to the mobile device. The mobile device establishes a virtual perimeter around its position, and monitors the signal strengths of Wi-Fi access points located within the virtual perimeter until changes in signal strengths indicate a change in location of the mobile device. If a change in signal strengths occurs, the mobile device has moved to a new position, that is, a position outside the virtual perimeter, and the mobile device communicates the new signal strengths from the access points in range to the location server. The location server then calculates and communicates the new position to the mobile device. The mobile device establishes a new virtual perimeter around its new location, and the method iterates.

Various embodiments of an apparatus and method for limiting redundant positioning polling from a mobile device in a Real-Time Location System (RTLS) are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention provide a method and apparatus for limiting redundant positioning polling from a mobile device in a Real-Time Location System (RTLS). Advantageously, embodiments of the present invention transmit signals used for location polling only when necessary, e.g., the mobile device has moved a significant distance from its previous location. The mobile devices work with reduced power consumption, and the system experiences better efficiency since network connections with the location server are established only as needed, rather than in a continuous manner.

FIG. 1 is a block diagram of a system for limiting redundant positioning polling from a mobile device in a Real-Time Location System (RTLS), according to one or more embodiments. The system 100 comprises at least one client device, such as a mobile device 102 communicably coupled with a location server 120 via a communications network 118.

The mobile device 102 is a type of computing device (e.g., a laptop, a desktop, a Personal Digital Assistant (PDA), a tablet, a mobile phone and/or the like) known to one of ordinary skill in the art. The mobile device 102 comprises a Central Processing Unit (CPU) 106, support circuits 108, and a memory 104. The CPU 106 may comprise one or more commercially available microprocessors or microcontrollers that facilitate data processing and storage. The various support circuits 108 facilitate the operation of the CPU 106 and include one or more clock circuits, power supplies, cache, input/output circuits, transceiver, displays, accelerometers, gyroscopes and the like. The memory 104 comprises at least one of Read Only Memory (ROM), Random Access Memory (RAM), disk drive storage, optical storage, removable storage and/or the like. The memory 104 comprises a location client module 110. The location client module 110 includes an access point signal strength reader 112, a virtual perimeter calculator 114, and a current position 116.

According to some embodiments, the access point signal strength reader 112 reads and measures the signal strengths of various access points within a virtual perimeter around the mobile device. In some embodiments, the signal strength of an access point increases or decreases based on the proximity of the access point to the mobile device 102. The access point signal strength reader 112 stores the signal strengths of the access points in a Wi-Fi access point signal strength matrix 134.

According to some embodiments, the virtual perimeter calculator 114 establishes a virtual perimeter around the current position 116. According to some embodiments, the virtual perimeter is defined as a radial distance from the current location of the mobile device and defines the Wi-Fi access points which will be monitored during position polling. The virtual perimeter is associated with the current position of the mobile device. Further, the virtual perimeter calculator 114 is configured to establish a new virtual perimeter around the mobile device 102 if the mobile device moves outside the previous virtual perimeter.

In an embodiment, the location client module 110 determines whether the mobile device 102 has moved outside of the virtual perimeter. In some embodiments, the location client module 110 compares previous signal strength readings from the Wi-Fi access points signal strength matrix 134 with current signal strength readings from Wi-Fi access points within the current virtual perimeter, as measured by the access point signal strength reader 112 using, for example, a transceiver 138 of the mobile device 102. If the location client module 110 determines that the mobile device has moved outside the virtual perimeter, it transmits the new access point signal strength information to the location server 120. If the mobile device does not move, or moves within the virtual perimeter, the location client module does not update the location server 120, but continues to monitor movement of the mobile device with respect to the virtual perimeter.

The location server 120 is a type of computing device (e.g., a laptop, a desktop, and/or the like) known to one of ordinary skill in the art. The location server 120 is any form of computing device that has sufficient computational power to compute locations from the signal strength information sent by the mobile device 102. The location server 120 comprises a Central Processing Unit (CPU) 122, support circuits 124, and a memory 126. The CPU 122 may comprise one or more commercially available microprocessors or microcontrollers that facilitate data processing and storage. The various support circuits 124 facilitate the operation of the CPU 122 and include one or more clock circuits, power supplies, cache, input/output circuits, and the like. The memory 126 comprises at least one of Read Only Memory (ROM), Random Access Memory (RAM), disk drive storage, optical storage, removable storage and/or the like. The memory 126 comprises a controller 128. The controller 128 includes a position calculator 130, a location map 132, and baseline signal strengths 136.

According to some embodiments, the controller 128 comprises the position calculator 130 for calculating a new position for the mobile device 102 based on access point signal strength data received from the location client module 110. The location map 132 is a graphical representation of a physical location, i.e., a floor plan of the location containing the locations of all Wi-Fi access points in the location. The baseline signal strengths 136 are baseline signal strength readings of all Wi-Fi access points on the location map 132 generated when the location server is provisioned. The access point signal strength associated with a particular access point correlates with the distance of the mobile device from that access point. Thus, based on the access point signal strength data measured by the mobile device 102, the position calculator 130 reads the information received from the location client module 110, determines which Wi-Fi access points the mobile device is measuring readings from and, based on the signal strength readings, compares these to the baseline measurements in the baseline signal strengths 136 and determines where on the location map 132 the mobile device 102 is located. In one embodiment, the position calculator 130 uses trilateralization techniques such as those generally known in the art, for calculating the position of the mobile device 102 based on the access point signal strength data. After calculation of the new position of the mobile device 102, the controller 128 communicates the new position to the mobile device 102, and the new position is then stored as the current position 116.

The network 118 comprises a communication system that connects computers by wire, cable, fiber optic and/or wireless link facilitated by various types of well-known network elements, such as hubs, switches, routers, access points and the like. The network 118 may employ various well-known protocols to communicate information amongst the network resources. For example, the network 118 may be a part of the Internet or Intranet using various communications infrastructure, such as Ethernet, Wi-Fi, Wi-Max, General Packet Radio Service (GPRS), and the like. In one embodiment, the network 118 is a wireless network having several access points configured to communicably couple with computers, for example, the location server 120, and mobile devices, for example, the mobile device 102.

Figure 2:
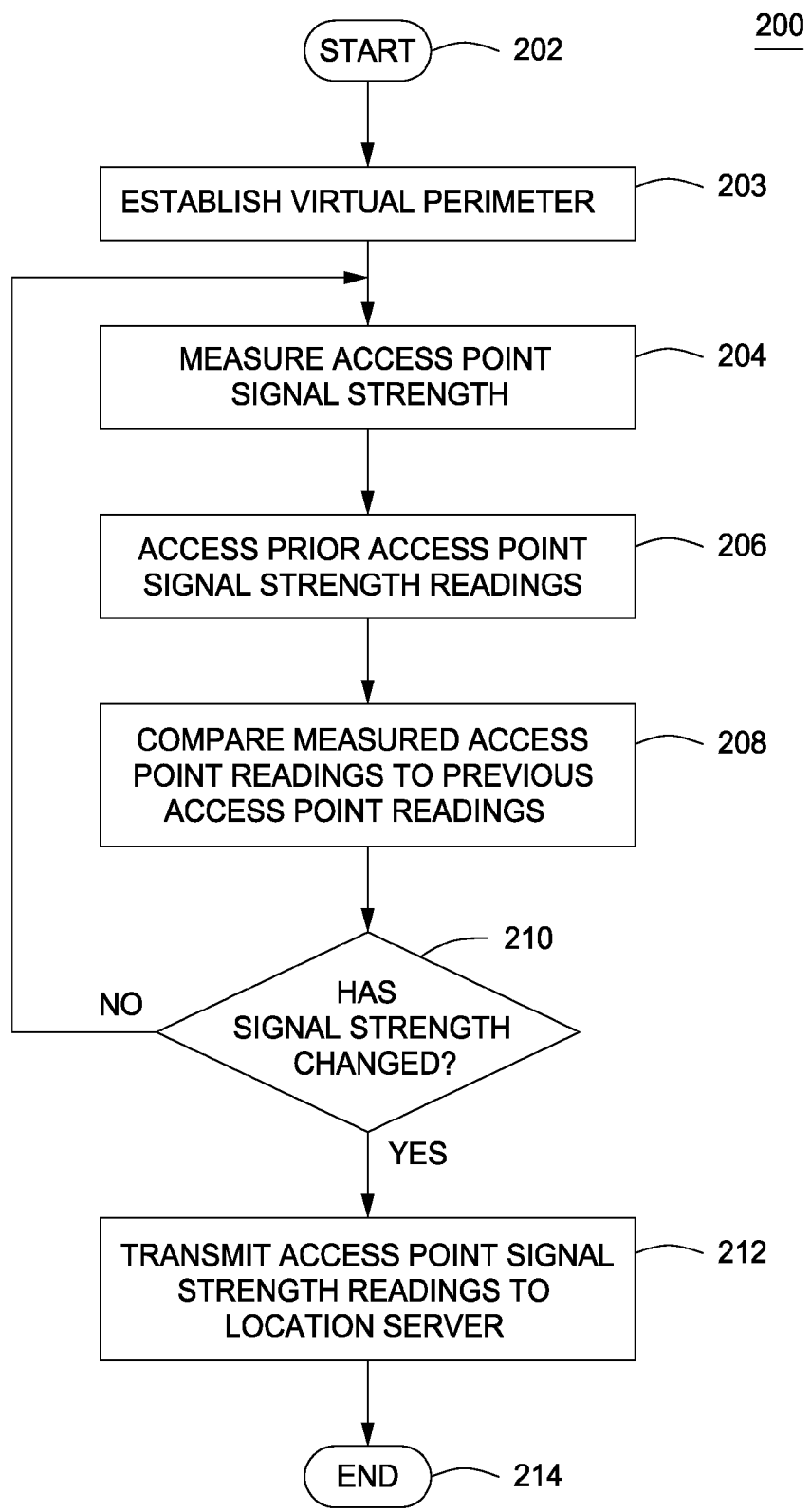
FIG. 2 depicts a flow diagram of a method for transmitting access point signal strengths to a location server representing an implementation of the location client module of FIG. 1, according to one or more embodiments.

FIG. 2 depicts a flow diagram of a method 200 for transmitting access point signal strength information based on a change in the signal strength of access points, as implemented by the location client module 110 of FIG. 1, according to one or more embodiments. The method 200 represents execution of the location client module using the mobile device, according to an embodiment of the invention. The method 200, according to one embodiment, determines if there is any change in the signal strength of access points within the virtual perimeter around the mobile device, and transmits the new signal strength information to a location server.

The method 200 starts at step 202, and proceeds to step 203. At step 203, the method 200 establishes a virtual perimeter around the current location. All Wi-Fi access points within that virtual perimeter will be monitored by the mobile device. The method 200 then proceeds to step 204. At step 204, the location client module 110 of FIG. 1 measures signal strengths of Wi-Fi access points. The method 200 then proceeds to step 206. At step 206, the location client module retrieves previous signal strengths of the access points from the Wi-Fi access point signal strength matrix. The method 200 then proceeds to step 208. At step 208, the location client module compares the current signal strength readings to the previous signal strength readings.

The method 200 then proceeds to step 210. At step 210, the method 200 determines whether the current signal strength readings have changed to indicate the mobile device has moved outside the virtual perimeter. If the method 200 determines the current signal strength readings have changed, the method 200 proceeds to step 212. At step 212, the method 200 determines that the mobile device has moved to a new position, and the access point signal strengths are transmitted to the location server. The method 200 then proceeds to step 214 and ends.

If at step 210, it is determined that the current signal strengths have not changed with respect to previous signal strengths, the method 200 determines that the mobile device has not moved to a new position, and the method 200 proceeds back to the 204.

Figure 3:
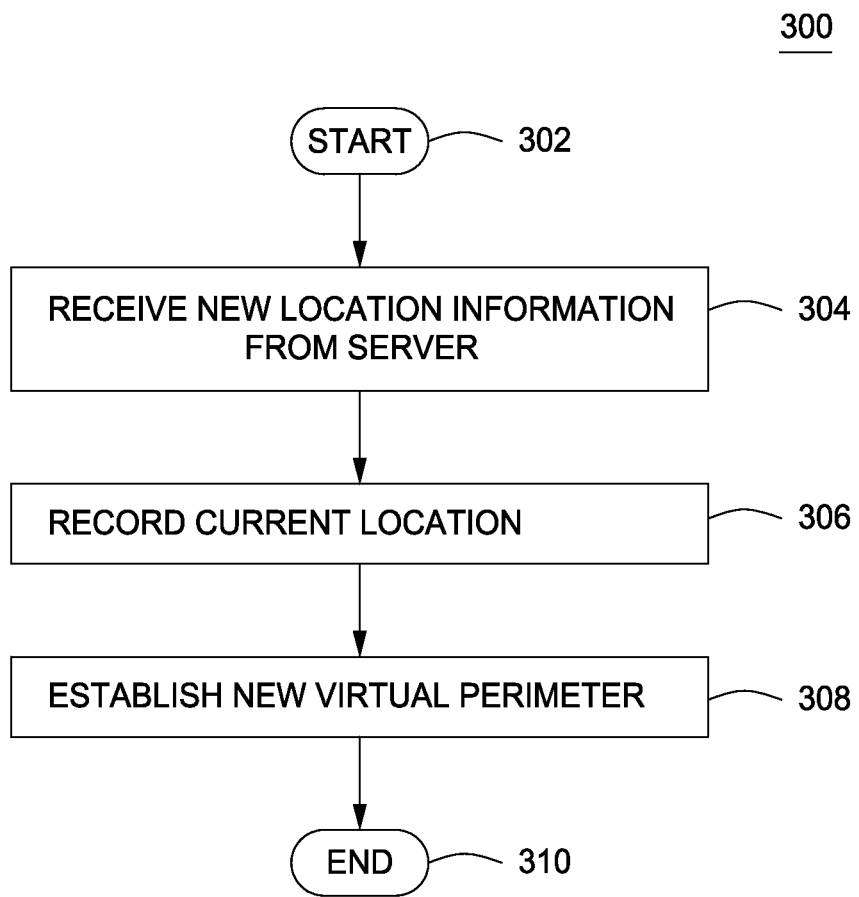
FIG. 3 depicts a flow diagram of a method for establishing a new virtual perimeter as performed by the virtual perimeter calculator of FIG. 1, according to one or more embodiments.

FIG. 3 depicts a flow diagram of a method 300 for establishing a new virtual perimeter as implemented by the virtual perimeter calculator 114 of FIG. 1, according to one or more embodiments. The method 300 illustrates the response of the location client module after transmitting signal strength information to the location server, for example, as illustrated by FIG. 2. The location client module records a new position received from the location server as the current position, and creates a new virtual perimeter around the mobile device using the virtual perimeter calculator. The method 300 defines a plurality of Wi-Fi access points within the new virtual perimeter that will be monitored.

The method 300 starts at step 302 and proceeds to step 304. At step 304 the method 300 receives new position information from the location server. The method 300 then proceeds to step 306. At step 306, the current position is updated with the new position information from the position calculator 130. The method 300 then proceeds to step 308. At step 308, the method 300 establishes a new virtual perimeter. The virtual perimeter calculator creates a new virtual perimeter around the mobile device which comprises defining new Wi-Fi access points to be monitored. The method 300 then proceeds to step 310 and ends.

Figure 4:
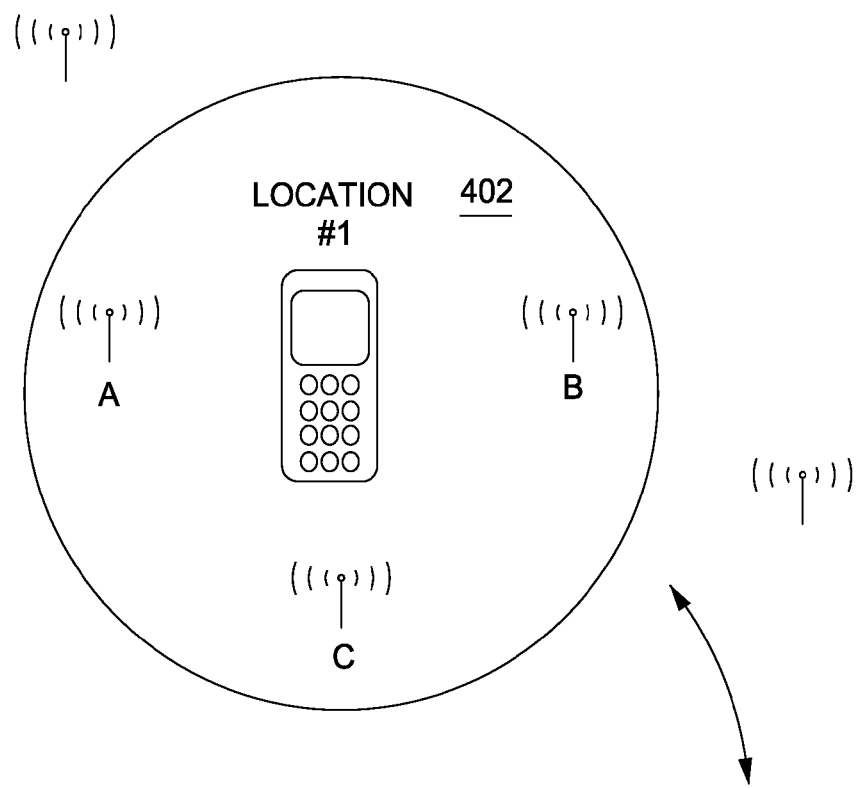
FIG. 4 depicts a schematic illustrating establishment of a new virtual perimeter when the mobile device changes its position as established by the mobile device of FIG. 1, according to one or more embodiments.
Figure 4:
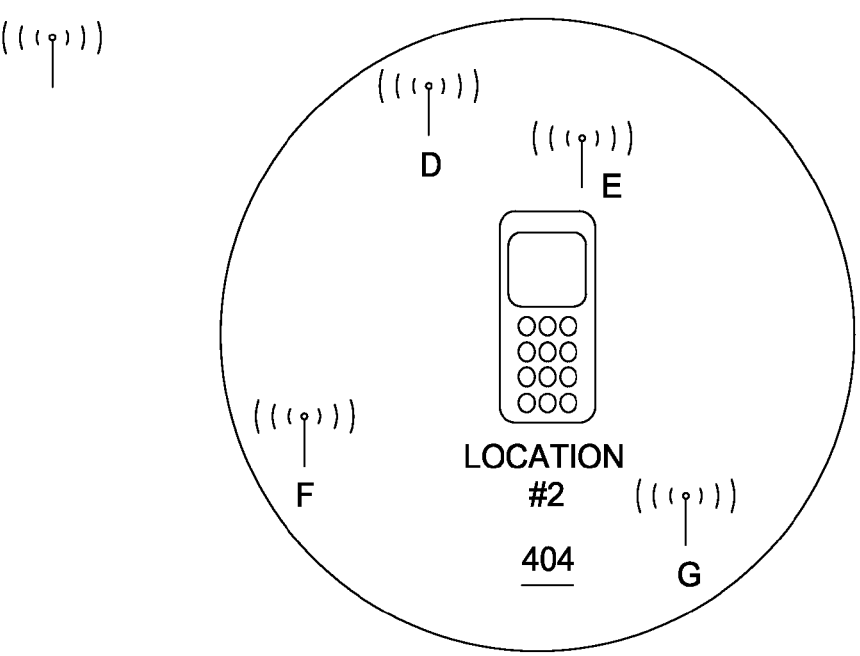

FIG. 4 depicts a schematic 400 illustrating establishment of a new virtual perimeter when the mobile device changes its position, according to one or more embodiments. For example, initially, the mobile device (the mobile device 102 of FIG. 1) is at location #1. The mobile device has a current virtual perimeter associated with the location #1, and monitors the signal strength from the Wi-Fi access points, such as access points A, B, and C associated with the current virtual perimeter. The access point signal strength reader continues to monitor the signal strength for the access points A, B, C and compare the new readings with the previously recorded readings. In an embodiment, the signal strength readings may indicate that the signal strengths of Wi-Fi access points A, B and C have decreased or are no longer readable and the signal strengths of Wi-Fi access points D, E, F, and G are received by the mobile device. In response to this movement outside of the virtual perimeter, the signal strength read by the mobile device, namely from access points D, E, F, and G are transmitted to the location server. As illustrated by the embodiment of FIG. 4, the mobile device has moved outside the virtual perimeter. When the mobile device determines the signal strength change, the location client module transmits the current signal strength information to the location server. The location client module then receives the new location information from the location server, indicating to the location client module that the mobile device has moved to a new location #2. In response to movement of the mobile device to the new location #2, the virtual perimeter calculator establishes a new virtual perimeter and monitors the signal strength from the Wi-fi access points contained therein, such as access points D, E, F and G located within the new virtual perimeter, and the movement of the mobile device with respect to the new virtual perimeter is then monitored iteratively based on access point signal strength. In one embodiment, the movement of the mobile device with respect to the new virtual perimeter is monitored continuously.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
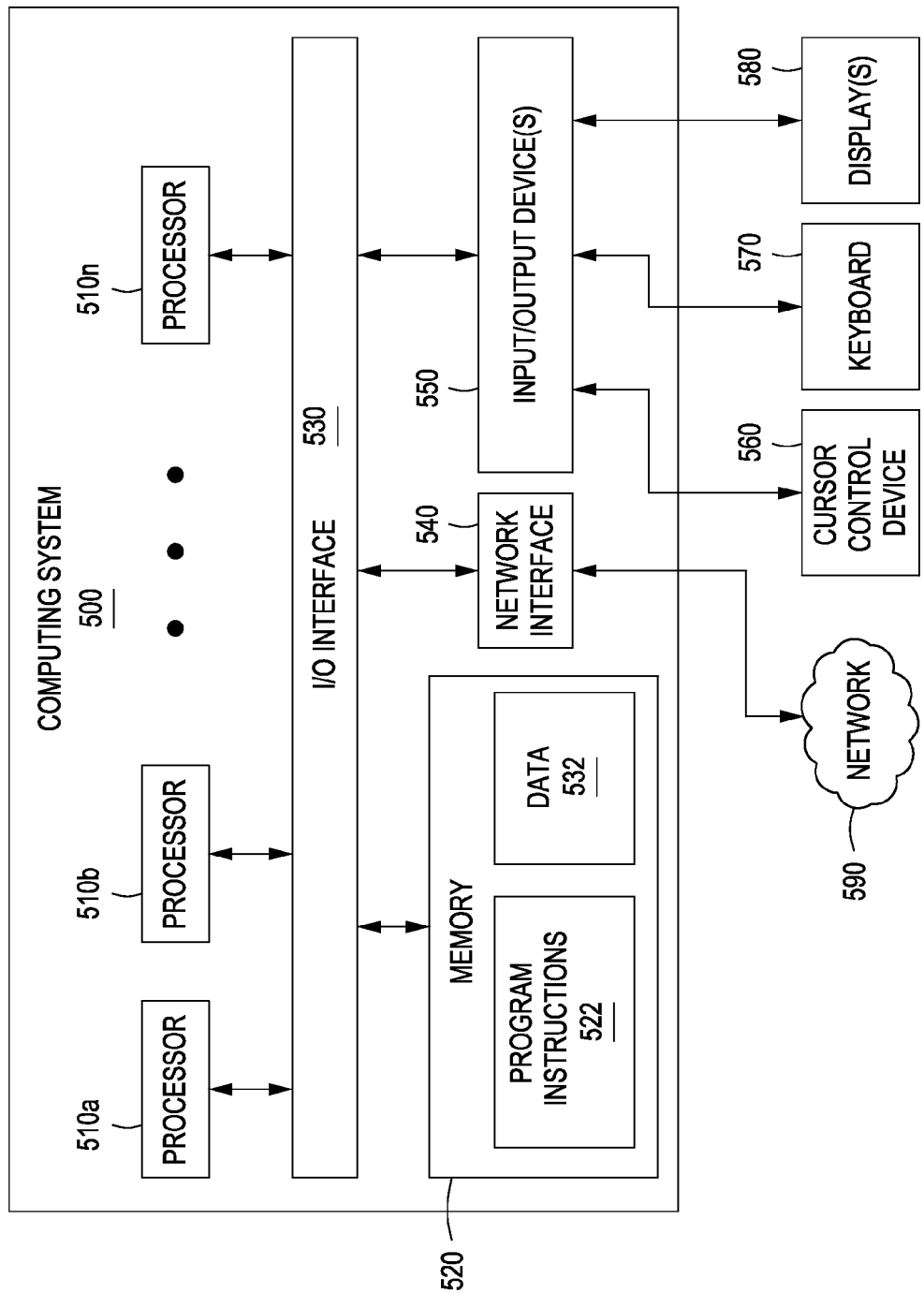
FIG. 5 depicts a computer system that can be utilized in various embodiments of the present invention to implement the mobile device and/or location server, according to one or more embodiments.

FIG. 5 depicts a computer system that can be utilized in various embodiments of the present invention to implement the mobile device 102 and/or location server 120, according to one or more embodiments.

Various embodiments of method and apparatus for limiting redundant positioning polling from a mobile device in a RTLS, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200 and 300, as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550, In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIGS. 2-3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method of limiting redundant positioning polling from a mobile device in a Real-Time Location System (RTLS) comprising:
    reading a current position of the mobile device;
    establishing a virtual perimeter around the mobile device;
    measuring a first plurality of signal strengths from a plurality of access points within the virtual perimeter;
    determining whether the mobile device has moved outside of the virtual perimeter by:
        reading a second plurality of signal strengths from the plurality of access points within the virtual perimeter,
        comparing the second plurality of signal strengths from the plurality of access points to the first plurality of signal strengths from the plurality of access points, and
        determining whether signal strengths from the plurality of access points have changed to indicate movement outside the virtual perimeter; and
    transmitting a plurality of signal strengths from a plurality of access points to a location server when the mobile device has moved outside of the virtual perimeter.

2. The method of claim 1, further comprising:
    receiving an updated current position for the mobile device from the location server;
    recording the updated current position for the mobile device; and
    establishing an updated virtual perimeter around the mobile device.

3. The method of claim 1 wherein establishing a virtual perimeter comprises defining a plurality of access points to be monitored for their signal strength.

4. The method of claim 1, wherein the signal strength of the access point increases or decreases based on proximity of the access point to the mobile device.

5. The method of claim 1, wherein the signal strengths are transmitted to the location server when the change in signal strengths indicates movement outside the virtual perimeter.

6. A system for limiting redundant positioning polling from a mobile device in a Real-Time Location System (RTLS) comprising:
    a location client module residing on the mobile device for measuring a plurality of signal strengths from a plurality of access points within a virtual perimeter, and determining whether the mobile device has moved outside of the virtual perimeter,
        wherein the location client module is configured to transmit the plurality of signal strengths, from the plurality of Wi-Fi access points to the location server, when comparing the signal strength readings to a plurality of previously recorded signal strength readings indicates the mobile device has moved outside of the virtual perimeter; and
    a location server configured to calculate a new position for the mobile device based on the signal strengths from a plurality of access points.

7. The system of claim 6, wherein the location client module comprises:
    an access point signal strength reader configured to measure a plurality of signal strengths from a plurality of Wi-Fi access points within the virtual perimeter;
    a virtual perimeter calculator configured to establish a virtual perimeter around the mobile device;
    a Wi-Fi access point signal strength matrix for storing the plurality of signal strengths from the plurality of Wi-Fi access points; and
    a current position for storing the current position of the mobile device.

8. The system of claim 6, wherein the location server comprises a position calculator operative to calculate an updated location for the mobile device.

9. The system of claim 8, wherein the location server sends the mobile device the updated location of the mobile device.

10. The system of claim 6, wherein the location client module is configured to record the updated location and to establish a new perimeter around the updated location received from the location server.

11. The system of claim 6, wherein the virtual perimeter is established by defining a plurality of access points to be monitored for their signal strength.

12. The system of claim 6, wherein the signal strength of the access point increases or decreases based on proximity of the access point to the mobile device.

13. A non-transitory computer readable medium for storing computer instructions that, when executed by at least one processor cause the at least one processor to perform a method of limiting redundant positioning polling from a mobile device in a Real-Time Location System (RTLS) comprising:
    reading a current position of the mobile device;
    establishing a virtual perimeter around the mobile device;
    measuring a first plurality of signal strengths from a plurality of access points within the virtual perimeter;
    determining whether the mobile device has moved outside of the virtual perimeter by:
        reading a second plurality of signal strengths from the plurality of access points within the virtual perimeter,
        comparing the second plurality of signal strengths from the plurality of access points to the first plurality of signal strengths from the plurality of access points, and
        determining whether signal strengths from the plurality of access points have changed to indicate movement outside the virtual perimeter; and
    transmitting a plurality of signal strengths from a plurality of access points to a location server when the mobile device has moved outside of the virtual perimeter.

14. The computer readable medium of claim 13, wherein the method performed by execution of the instructions further comprises:
    receiving an updated current position for the mobile device from the location server;
    recording the updated current position for the mobile device; and
    establishing an updated virtual perimeter around the mobile device.

15. The computer readable medium of claim 13, wherein establishing a virtual perimeter comprises defining a plurality of access points to be monitored for their signal strength.

16. The computer readable medium of claim 13, wherein the signal strength of the access point increases or decreases based on the proximity of the access point to the mobile device.

17. The computer readable medium of claim 13 wherein the signal strengths are transmitted to the location server when the change in signal strengths indicates movement outside the virtual perimeter.

* * * * *